United States Patent Office 3,539,900
Patented Nov. 10, 1970

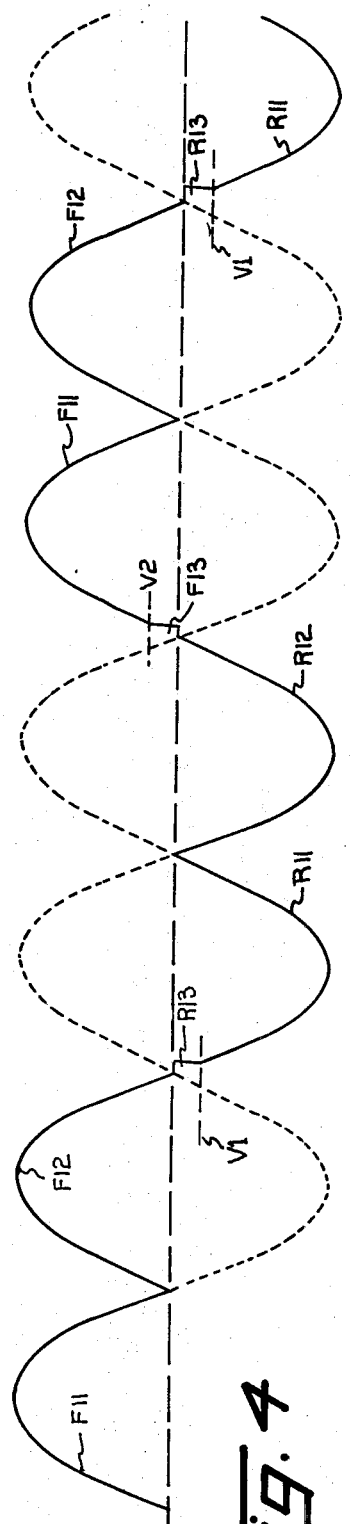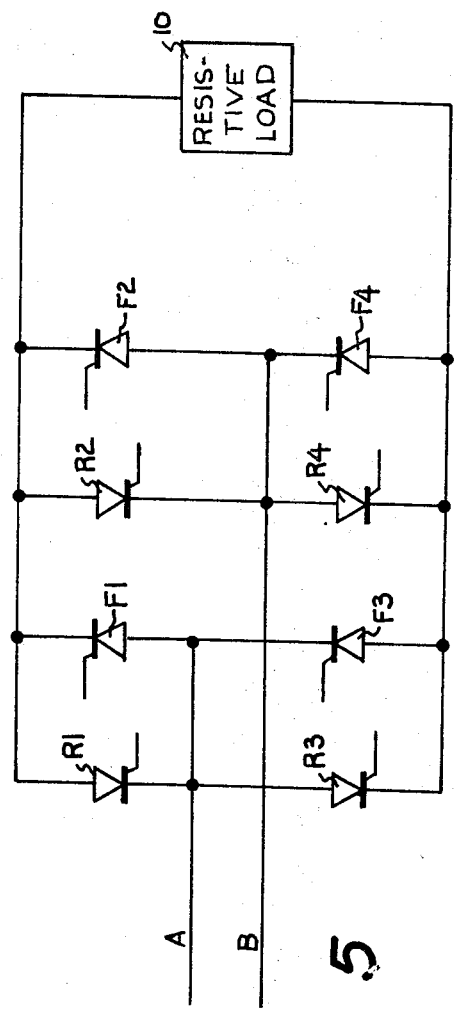

3,539,900
RECTIFIER LOCKOUT CIRCUIT
Burnette P. Chausse and Charles E. Konrad, Roanoke, Va., assignors to General Electric Company, a corporation of New York
Filed June 4, 1969, Ser. No. 830,338
Int. Cl. H02m 7/20
U.S. Cl. 321—5
5 Claims

ABSTRACT OF THE DISCLOSURE

A circuit for preventing the firing of the thyristors of one polarity in a full wave rectifier while the thyristors of opposite polarity are still conducting. In the circuit a voltage signal is developed across the nonconducting thyristors and applied to a Zener diode which selectively causes the signal to be applied to a transistor arranged to short-circuit a transformer winding, which condition is reflected in the voltage level of another winding of the transformer for inhibiting the thyristor firing circuits.

BACKGROUND OF THE INVENTION

The present invention relates to rectification of alternating current and more particularly to an arrangement for preventing short-circuit conditions in a rectification system where the resulting direct current polarity is interchangeable such as in cycloconverters, or when reversing a DC motor. To reverse the polarity of the direct current two separate full wave rectifiers, one for each direction, may be used. Due to the inherent function of the thyristor there is a possibility that thyristors may be conducting in one direction while thyristors for the other direction are being fired to conduct. This results in a short-circuit condition of the alternating current supply source. One manner of preventing such short-circuit is to provide a "spanning reactor" between the forward and reverse thyristors, thus during the transfer from forward to reverse, or vice versa, when both are simultaneously conducting and a short-circuit exists the reactors prevent the current from reaching a destructive level. Cycloconverters having this type of overlapping exhibit a lower harmonic distortion during transfer period.

A scheme which evolved when static reversing armature drives became popular was to reduce the size of the spanning reactor to a minimum by sensing the moment when the current in the one bank had reduced to zero and therethrough delaying the firing of the other bank until such condition indicated that the one bank had stopped conducting. This sensor used three current transformers in the alternating current lines with a three phase system or a single DC current transformer in the rectifier output circuit. This system has the disadvantage that the minimum detectable current is usually above the holding current level of a thyristor, and thus does not provide sufficient protection. A second problem is that to perform as required these current transformers need to be very sensitive resulting in saturation when very large currents occur, which could cause the one bank to be fired before the other bank has stopped conducting.

To overcome these problems, the present design in common use with motor field exciters uses a saturable reactor to determine when the thyristors are blocking, since this is a positive indication when none of the thyristors are conducting. A resistor in the saturable reactor circuit causes a time delay, which, when the circuit is used for reversing a DC motor is of little consequence. However, in a cycloconverter where the total time that each bank is conducting may be as short as 80% of the line frequency, the delay is intolerable. Reducing the value of the resistance to reduce the time delay causes a condition where the resistor may have to dissipate undesirable amounts of power. In view of these problems the present invention provides conditions which promote sensitivity without heat dissipation requirements.

SUMMARY OF THE INVENTION

To provide these conditions the invention teaches an apparatus for applying a controlling signal to a pair of thyristors which are connected to an alternating current source in an opposing conducting arrangement. The apparatus has a transformer having one winding connected in parallel to a short-circuiting circuit which is controlled by a pair of Zener diodes applying a signal to the short-circuiting circuit when the voltage across the thyristor pair reaches a predetermined value. The short-circuit condition of the winding is reflected in another transformer winding, thereby causing a controlling signal to be applied to the thyristors.

DESCRIPTION OF THE DRAWINGS

FIG. 4 is a graph showing a single phase alternating current as rectified by a pair of full wave rectifier bridges.

FIG. 5 is a block diagram showing the arrangement of thyristors for producing the rectified alternating current shown in FIG. 4.

DETAILED DESCRIPTION

Figure 1:
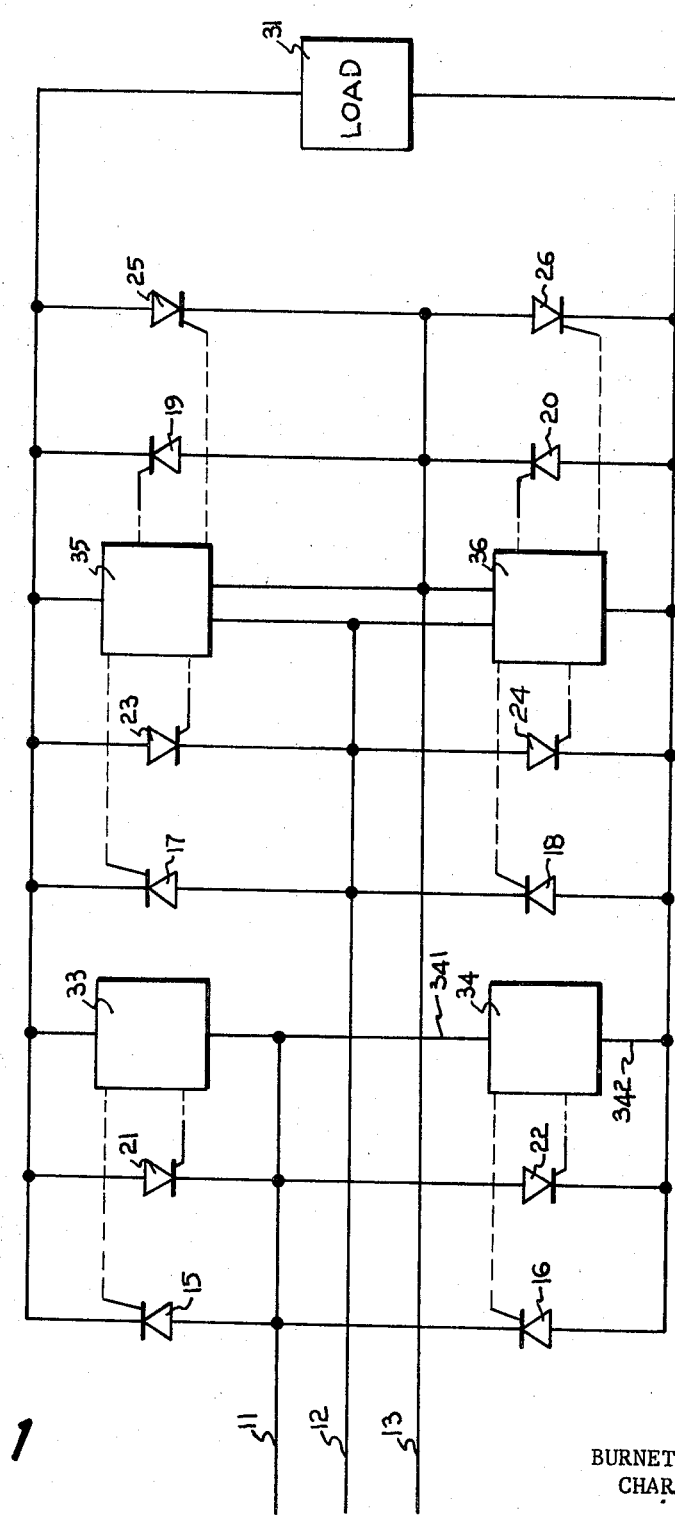
FIG. 1 is a block diagram showing relationship of lockout circuits with thyristors being controlled thereby in a three phase system.

FIG. 1 illustrates a three phase alternating current supply having the lines 11, 12 and 13 connected to two groups of thyristors, one group consisting of thyristors 15, 16, 17, 18, 19 and 20 permitting current to flow in one direction (toward the top of FIG. 1) and another group consisting of thyristors 21, 22, 23, 24, 25 and 26 permitting current to flow in the opposite direction (toward the bottom of FIG. 1).

Line 11 connects to thyristors 15 and 16 and to thyristors 21 and 22; line 12 connects to thyristors 17 and 18 and to thyristors 23 and 24; and line 13 connects thyristors 19 and 20 and thyristors 25 and 26. Cathodes of thyristors 15, 17, and 19 are connected to the anodes of thyristors 21, 23 and 25, respectively, and to one side of a load 31, and the cathodes of thyristors 22, 24 and 26 are connected to the anodes of thyristors 16, 18 and 20, respectively, and to the other side of load 31.

When the lines 11, 12 and 13 are energized, current flows from line 11, via thyristor 15, load 31, thyristor 18 to line 12 when line 11 is most positive and line 12 is most negative; from line 12 via thyristor 17, load 31, thyristor 20, to line 13 when line 12 is most positive and line 13 is most negative; and from line 13 via thyristor 19, load 31, thyristor 16 to line 11 when line 13 is most positive and line 11 is most negative in phase timed relationship. Similarly, current flows from line 11 via thyristor 22, load 31, thyristor 23 to line 12; from line 12 via thyristor 24, load 31, thyristor 25 to line 13; and from line 13 via thyristor 26, load 31, thyristor 21 to line 11 when each of the first-named lines is most positive and the last-named line is most negative.

Figure 2:
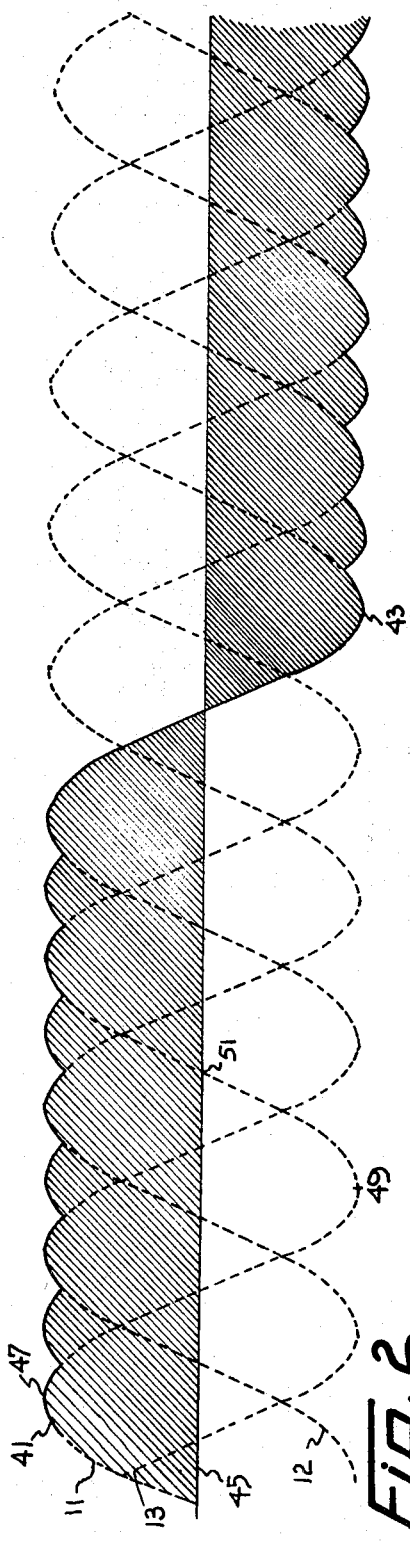
FIG. 2 shows a graph of a three phase alternating current supply alternately rectified by a pair of full wave rectifier bridges.
Figure 3:
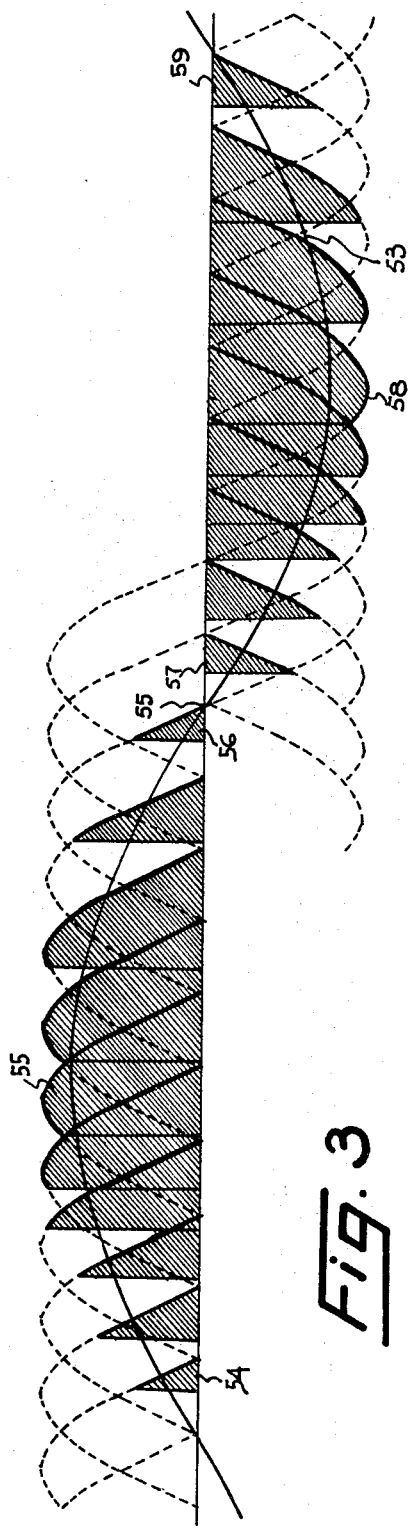
FIG. 3 is a graph showing the alternating current rectified by full wave rectifier bridge connected thyristors which are selectively fired to produce a new alternating current having a new frequency.

The output current of these rectifying circuits supplying a resistive load is graphically represented in FIG. 2 wherein locus 41 represents the output of the thyristors 15–20 and locus 43 the output of the thyristors 21–26, respectively. In FIG. 2 the value of alternating current in line 11 is shown to start at the zero level, represented by the time axis 45, increase in the positive direction to a maximum value at point 47, then decrease to zero and cross over time axis 45 to the negative side where the current increases to a maximum at point 49, and then returns to the zero value at point 51, thus completing one cycle. Similarly, phases 12 and 13 each complete one cycle displaced from each other and phase 11 by 120°. With full wave rectification it is possible to invert the negative side of the cycle thus providing direct current which is represented by the locus 41. Similarly, the positive side of the cycle may be inverted so that direct current is formed which is represented by locus 43. The thyristors controlling the rectification of the phased currents are controlled respectively to conduct, or to block these currents. For example, let the thyristors 15–20 conduct first, while thyristors 21–26 are blocking. This produces an output represented by locus 41. The thyristors 21–26 conduct next while the thyristors 15–20 block. This produces a current represented by locus 43. A new single phase alternating current results consisting of a positive section 41 and a negative section of locus 43. Selective firing of the thyristors will produce an alternating current which resembles a sinusoidal locus curve 53 in FIG. 3. To achieve this the firing of each thyristor is variably controlled during each half of the output cycle. Decreasing the firing delay time produces increased conduction time for the thyristors, and increasing the firing delay time causes the conduction time of the thyristors to be reduced, ultimately reducing conduction of the thyristors to zero. Thus, both the positive and the negative side of the new A/C cycle are developed by sinusodially modulating the firing delay times of the thyristors. The sections, generally identified as 54–58, represent typical conduction pattern for forming the new alternating current which has a mean value represented by locus 53. An increase in the frequency of the sinusoidal modulation of the firing delay produces a corresponding increase in frequency of the new alternating current. Similarly, decrease in the frequency of the sinusoidal modulation of the firing delay produces a corresponding decrease in frequency of the new alternating current.

In the circuit described in FIG. 1 a possibility exists that opposing thyristors may conduct at the same time, due to malfunction of the control or when inductive loads are controlled. In order to avoid this a graph is shown in FIG. 4 wherein the results of the selective firing of the thyristors shown in FIG. 5 are exemplified. Referring now to FIGS. 4 and 5, the locus F11 results from the firing of the thyristors F1 and F4 which allows current to flow through thyristor F1, load 10 and thyristor F4. Similarly, locus F12 results from the firing of thyristors F2 and F3 thereby allowing current to flow from line B through thyristor F2, load 10 and thyristor F3 to line A. Locus R11 results from the firing of thyristors R3 and R2 which allows current to flow from line A through load 10 to line B. Similarly, locus R12 is the resultant of firing thyristors R4 and R1, thereby allowing current to flow from line B through load 10 to line A.

Assume now that the "F" thyristors belong to the the forward group and the "R" thyristors belong to the reverse group so that in order to transfer conduction from the forward group to the reverse group the first requirement is to remove all the gate or firing pulses from thyristors F1–F4. This having been performed, a period of time is required before the opposing group comprising thyristors R1–R4 may be turned on because the currents in the forward thyristors F1–F4 may not have gone to zero yet due to an inductive load in the circuit or possibly faulty operation of some components. The amount of induction in the circuit determines the period of time required, hence for a large inductive load the delay period or deadband may be unreasonably long. When the frequency of the new alternating current is high, since the size of the deadband is constant for all frequencies, this condition may become intolerable; and it is therefore undesirable to have the delay or deadband fixed. The present invention therefore provides a means for transferring from one bank of thyristors to the other with the least amount of delay but with sufficient safety margin. This is performed by testing each of the thyristors in order to determine if they are blocking current. In the case of FIG. 5 before the transfer from the forward thyristors "F1–F4" to the reverse thyristors "R1–R4" can be made, it is necessary that the "F" thyristors are tested for current flow in order to assure that they are blocking before the "R" thyristors are gated to conduct.

The transition between opposing thyristors occurs at points R13 in FIG. 4. The firing of thyristors R3 and R2 is inhibited until the voltage across all thyristors has reached a predetermined voltage level V1. Similarly, when the transition is from the thyristors R4 and R1 to the thyristors F1 and F4 represented by the point F13, firing is again inhibited until the voltage across all thyristors reaches a predetermined value, V2. The voltage levels, V1 and V2, are equal in magnitude, each being set arbitrarily at a value greater than the forward voltage drop of the thyristors.

Figure 1A:
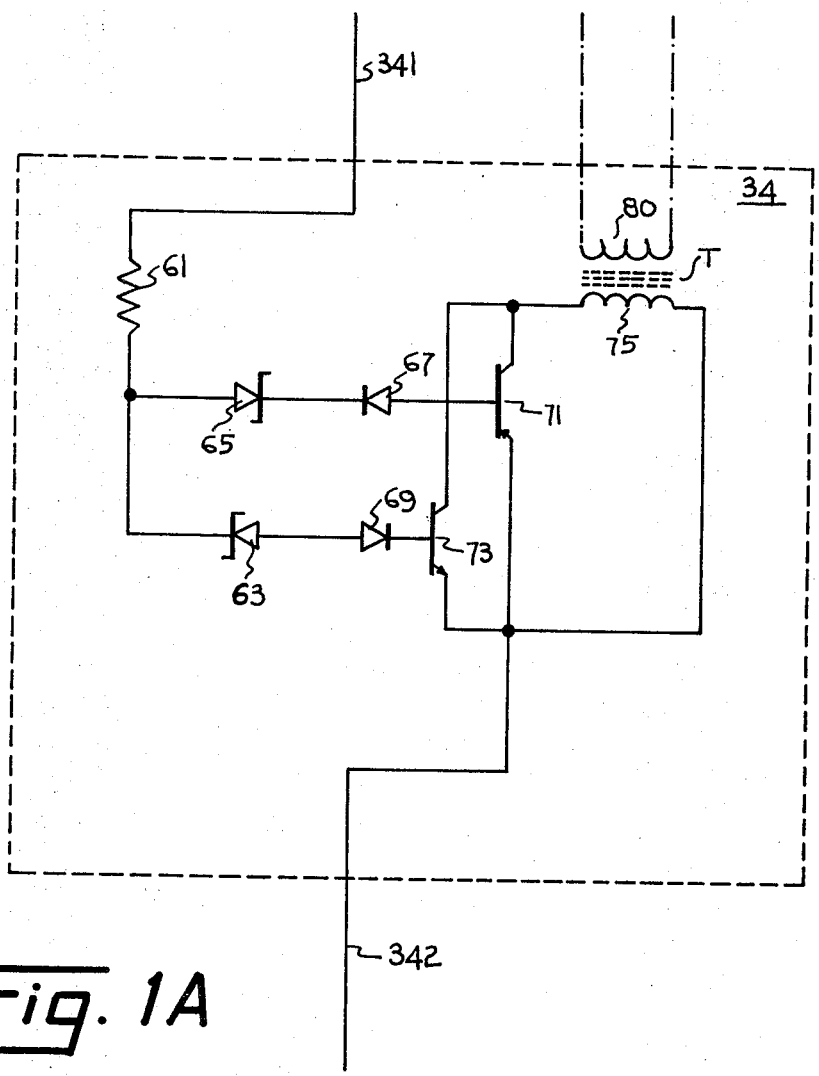
FIG. 1A is a schematic diagram showing the internal connections of the lockout circuit.

In order to determine whether or not complementary thyristors, such as thyristors 16 and 22, can be fired by their respective firing circuits (not shown) recourse is made to a circuit arrangement as shown in FIG. 1A, representative of box 34 (see FIG. 1). Lines 341 and 342 normally are connected as indicated in FIG. 1 across the thyristors 16 and 22 (see also FIG. 6). In FIG. 1A a pair of Zener diodes 63 and 65 are chosen to have a breakdown voltage greater than the aforementioned voltage levels V1 and V2. Each of these diodes, together with its associated diode and transistor (diode 69, transistor 73 and diode 67, transistor 71, respectively), is arranged to short-circuit a transformer secondary winding 75 of a transformer T whenever the voltage across either thyristor 16 or thyristor 22 exceeds the Zener value of diode 63 or 65. The short-circuited condition of the secondary winding 75 of the transformer T is reflected by a change of impedance in the primary winding 80.

Each of the boxes 33, 35 and 36 is similar to box 34; however, in the instances of boxes 35 and 36 the secondary winding (see winding 83 in respect to box 36—FIG. 6) is only short-circuited when none of the thyristors 18, 20, 24 or 26 is conducting.

Sensors 33 and 35 (FIG. 1), involving transformer windings 81 and 82 (FIG. 6) operate in the same manner as the sensor circuits 34 and 36 described above.

Figure 6:
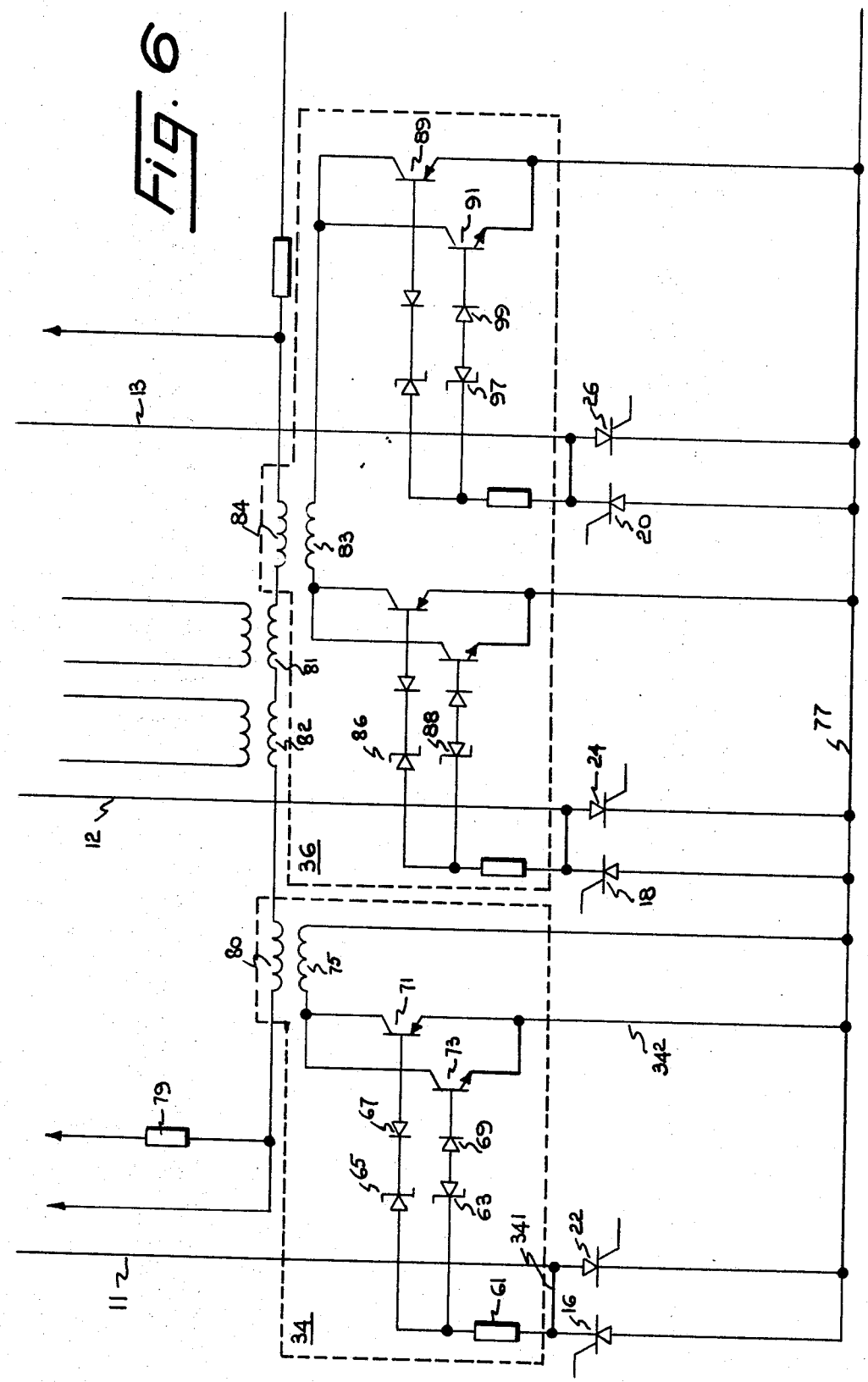
FIG. 6 shows the schematic arrangement of components of the lockout circuit as applied to a portion of the three phase system shown in FIG. 1.

The impedance of resistor 79 in FIG. 6 is selected to have a value which is much less than the impedance of the individual transformer primary windings 80, 81, 82 and 84 so that until all of the transformer secondary windings are short-circuited, and the voltage drop of their primary windings goes to zero, the voltage drop across the resistor 79 is of minor consequence. However, when all the primary winding impedances have gone to zero, the full voltage in the circuit is applied across the resistor 79 and indicates that all the thyristors are in a blocking state. The control (not shown) receiving the signal through resistor 79 then acts to remove the inhibit from the firing circuits of the opposing thyristors.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:
1. An apparatus for controlling a rectifier circuit including thyristors for conducting during one half of an alternating current cycle and other thyristors for conducting during the other half of the alternating current, comprising:
   (a) a pair of windings having mutual inductance,
   (b) means controlled by the first said thyristors to short-circuit one of said windings when said thyristors are noncoducting, and
   (c) means controlled by the other said winding when said first winding is short-circuited for controlling the firing of the other said thyristors.
2. The invention claimed in claim 1 wherein said pair of windings comprises the primary and secondary windings of a transformer.
3. The invention claimed in claim 2 wherein the controlled means comprises a pair of Zener diode controlled transistors for short-circuiting said secondary winding.
4. The invention of claim 3 further modified to include a Zener diode for each transistor, each of said Zener diodes connected to a diode for reciprocally conducting the positive and negative halves of the alternating current.
5. The invention claimed in claim 3 wherein said pair of transistors is connected in parallel opposition across said transformer secondary winding for short-circuiting said secondary winding when actuated by said Zener diodes during each half of the alternating current.

References Cited
UNITED STATES PATENTS

| | | | |
|---|---|---|---|
| 3,119,058 | 1/1964 | Genuit | 321—45 |
| 3,164,767 | 1/1965 | Morgan | 321—45 XR |
| 3,293,448 | 12/1966 | Amato. | |
| 3,320,514 | 5/1967 | Lawrence | 321—45 |
| 3,400,321 | 9/1968 | Lafuze | 321—11 XR |
| 3,423,665 | 1/1969 | Greenberg et al. | 321—45 XR |
| 3,427,528 | 2/1969 | Custer | 321—18 |
| 3,478,257 | 11/1969 | Kyr et al. | 321—11 |

WILLIAM M. SHOOP, Jr., Primary Examiner

U.S. Cl. X.R.

321—45